US008277238B2

(12) United States Patent
Matsumoto et al.

(10) Patent No.: US 8,277,238 B2
(45) Date of Patent: Oct. 2, 2012

(54) CARD CONNECTOR

(75) Inventors: Yasuyoshi Matsumoto, Yamato (JP); Yuichi Hasegawa, Yokohama (JP); Mitsuhiro Tomita, Yamato (JP); Yuji Naito, Yamato (JP); Yoko Takeuchi, Yamato (JP)

(73) Assignee: Molex Incorporated, Lisle, IL (US)

( * ) Notice: Subject to any disclaimer, the term of this patent is extended or adjusted under 35 U.S.C. 154(b) by 25 days.

(21) Appl. No.: 12/867,820

(22) PCT Filed: Feb. 13, 2009

(86) PCT No.: PCT/US2009/034024
§ 371 (c)(1),
(2), (4) Date: Nov. 8, 2010

(87) PCT Pub. No.: WO2009/102932
PCT Pub. Date: Aug. 20, 2009

(65) Prior Publication Data
US 2011/0201229 A1    Aug. 18, 2011

(30) Foreign Application Priority Data

Feb. 14, 2008    (JP) .................................. 2008-032775

(51) Int. Cl.
*H01R 3/00*    (2006.01)
(52) U.S. Cl. ..................... 439/188; 439/489; 439/945
(58) Field of Classification Search .................. 439/188, 439/489, 488, 945, 946
See application file for complete search history.

(56) References Cited

U.S. PATENT DOCUMENTS

| 6,126,464 | A   | * | 10/2000 | Chang ........................... 439/188 |
| 6,607,405 | B2  |   | 8/2003  | Nishimura |
| 6,612,498 | B1  |   | 9/2003  | Lipponen et al. |
| 6,666,724 | B1  |   | 12/2003 | Lwee |
| 6,817,874 | B2  |   | 11/2004 | Okabe |
| 7,473,115 | B2  | * | 1/2009  | Yu et al. ........................ 439/188 |
| 7,972,156 | B2  | * | 7/2011  | Zhou et al. .................... 439/188 |
| 2004/0023538 | A1 | * | 2/2004 | Masson et al. ................. 439/188 |
| 2008/0090437 | A1 | * | 4/2008 | Huang et al. ................... 439/188 |

OTHER PUBLICATIONS

International Search Report and Written Opinion of PCT Patent Application No. PCT/US2009/034024, issued on Oct. 6, 2009.

* cited by examiner

*Primary Examiner* — Gary F. Paumen
(74) *Attorney, Agent, or Firm* — Timothy M. Morella

(57) ABSTRACT

A card connector (1) is disclosed. The card connector (1) comprises a housing (11), at least one terminal (51), a card guiding mechanism and an identification switch. The housing (11) is configured to accommodate a card adapter (101), in which a first card (201) is fitted, or a second card (301). Each of the at least one terminals (51) is attached to the housing (11). The card guiding mechanism includes an urging member (81). The urging member (81) is configured to urge the card adapter (101) or the second card (301) in a direction opposite to an insertion direction. The card guiding mechanism is configured to hold in a lock position the card adapter (101) or the second card (301) pushed in the insertion direction by way of push operation. The identification switch is formed by a first contact member (52) and a second contact member (53), and is arranged further inward in the insertion direction from an insertion direction front end (301a) of the second card (301) held in the lock position. The identification switch is configured to identify the card adapter (101) and the second card (301). The card adapter (101) has a front projection (103) extending forward from an insertion direction front end (101a). The first contact member (52) is displaced in the thickness direction of the card adapter (101) and comes into contact with the second contact member (53) when abutting against the front projection (103) of the card adapter (101).

13 Claims, 17 Drawing Sheets

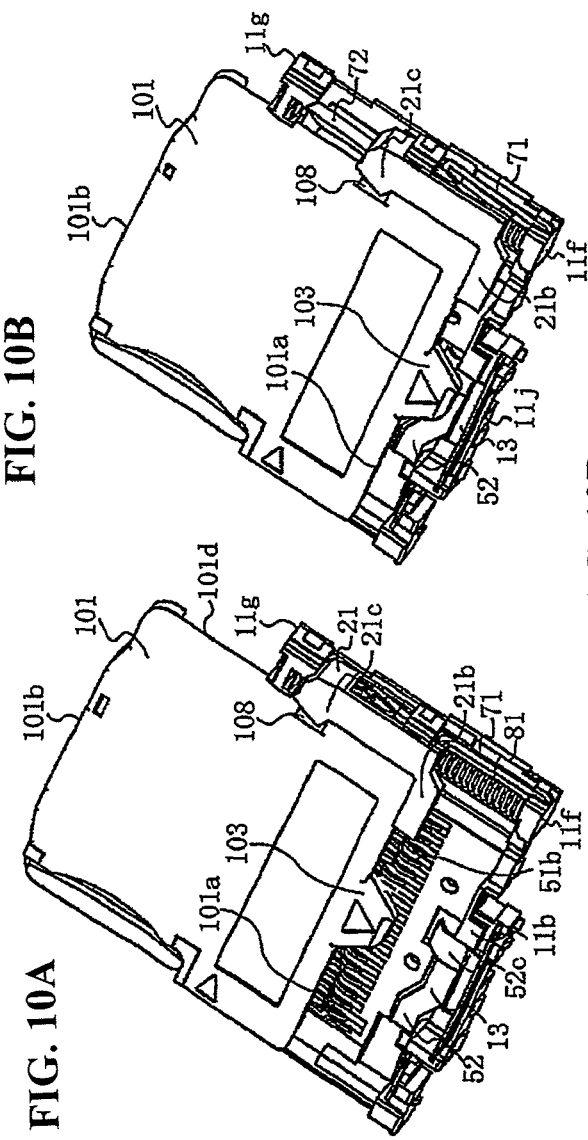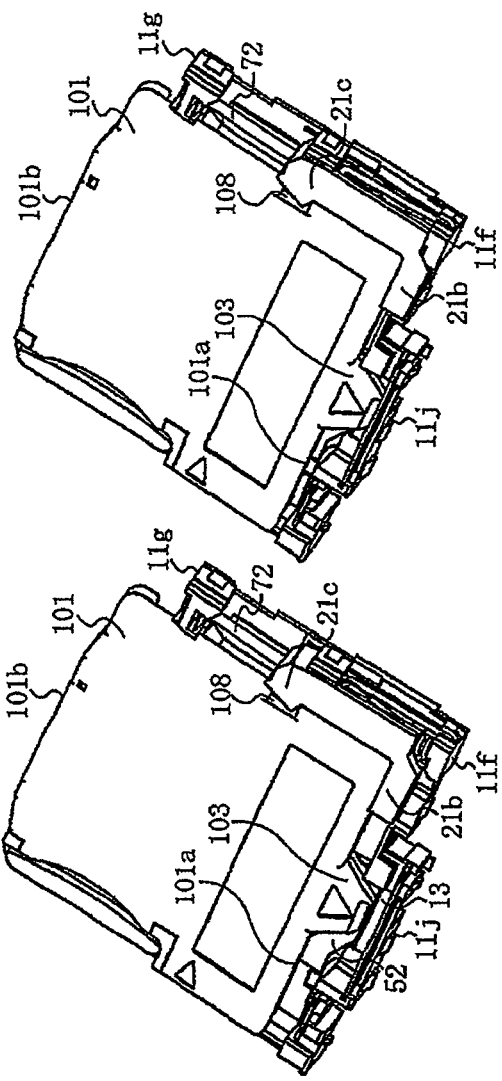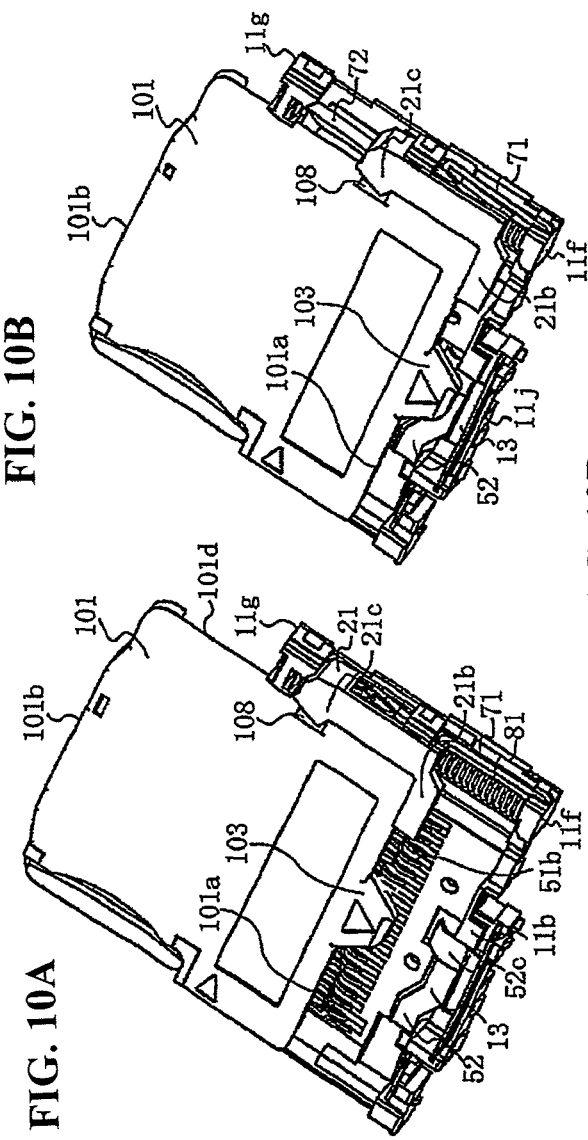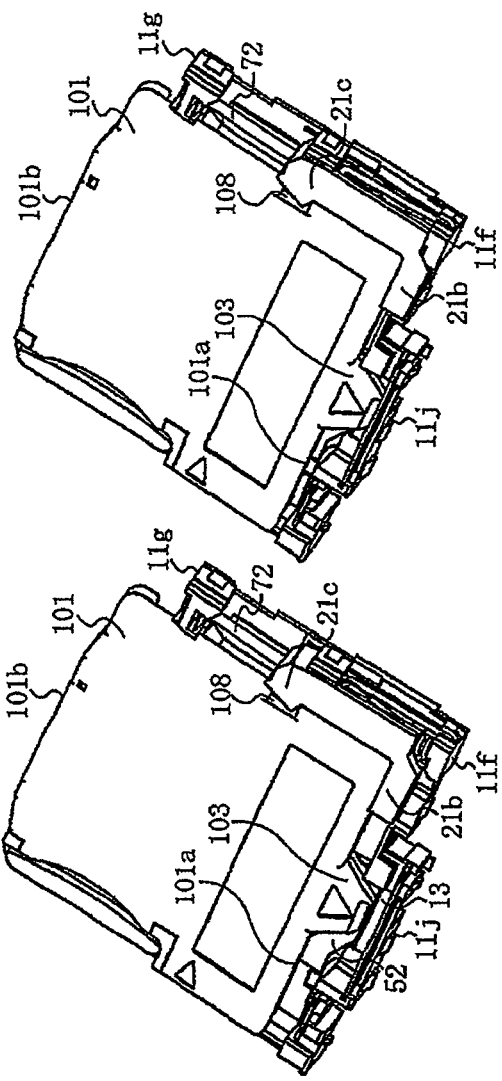

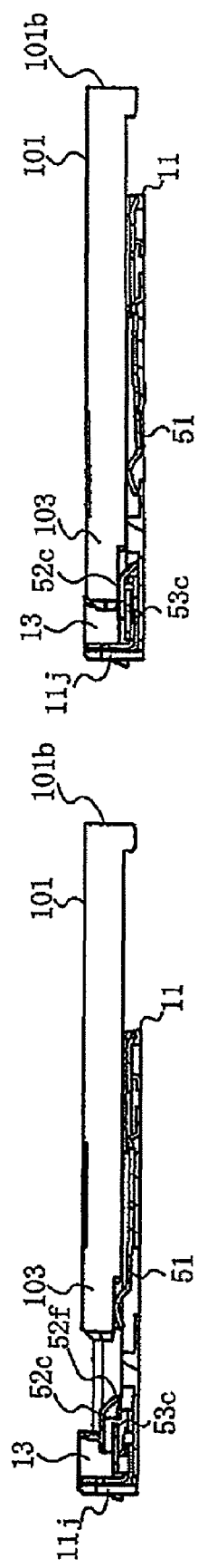
FIG. 12A
FIG. 12B
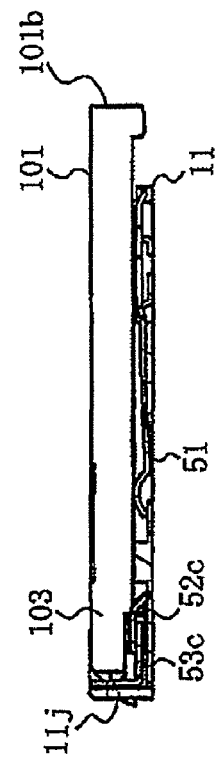
FIG. 12C
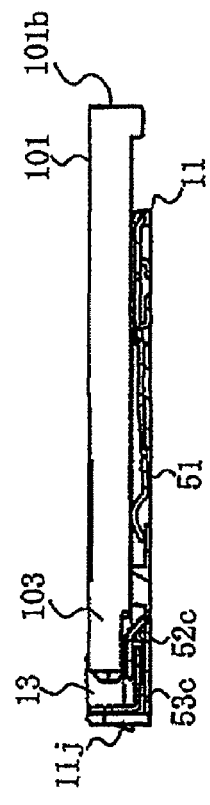
FIG. 12D

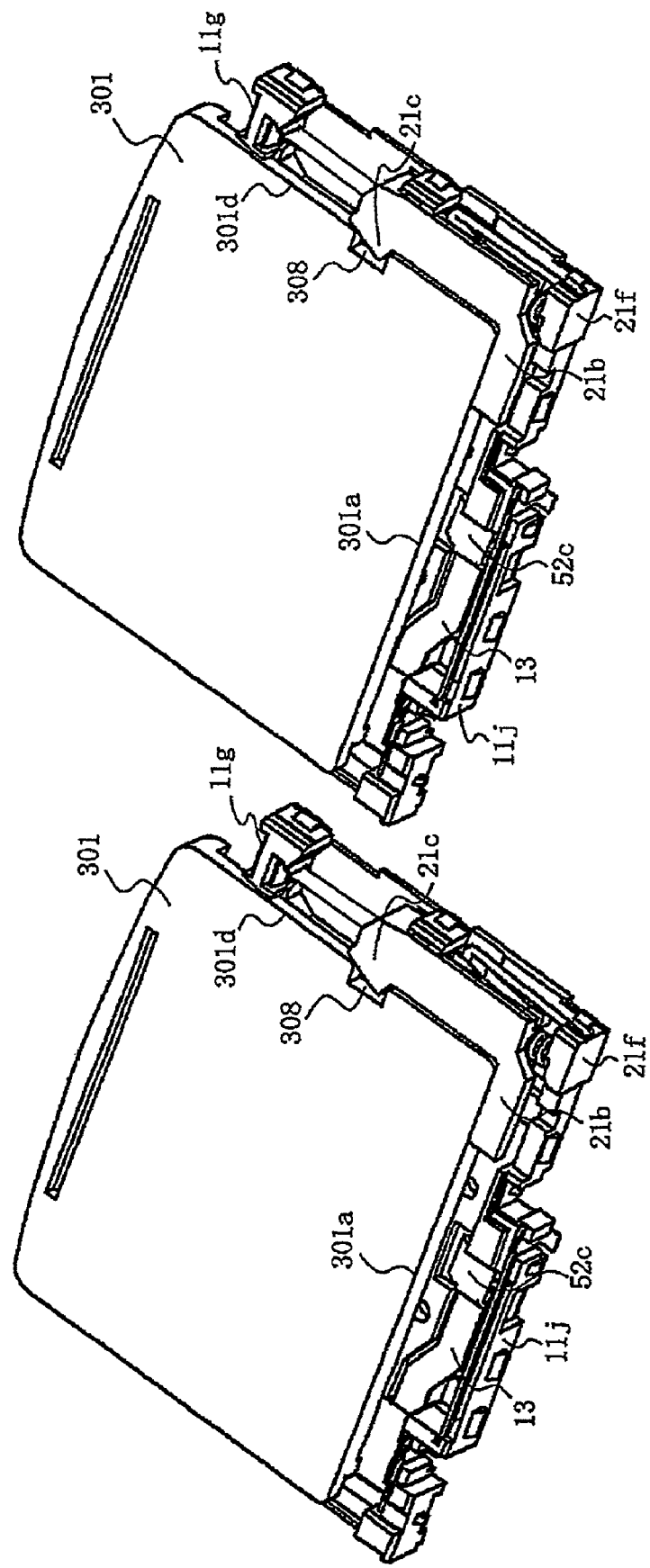

CARD CONNECTOR

CROSS-REFERENCE TO RELATED APPLICATIONS

The Present Invention claims priority to Japanese Patent Application No. 2008-032775, filed with the Japanese Patent Office on 14 Feb. 2008.

FIELD OF THE INVENTION

The Present Invention relates generally to a card connector and, more particularly, to a card connector adapted for receiving a card and having a card detector for detecting the insertion of a card.

BACKGROUND OF THE INVENTION

A card connector having a card detection switch for detecting the insertion of a memory card in order to turn a power source on or off, corresponding to the insertion or removal of a memory card has been proposed in, for example, Japanese Patent Laid-Open (Kokai) Application No. 2000-48916.

FIG. 17 illustrates a card detection switch of a conventional card connector. Disclosed in FIG. 17 is first switch member 852 and second switch member 853 of a card detection switch. As illustrated, first switch member 852 and second switch member 853 are arranged side-by-side in a width direction of the memory card, together with terminals connected to the contact pads of the memory card and fitted on a bottom plate of a housing. Further, first switch member 852 and second switch member 853 extend in the insertion direction of the memory card as indicated by Arrow P. First switch member 852 and second switch member 853 are arranged parallel to each other, and do not come into contact with each other while the memory card is not inserted into the housing.

Pressing part 852f, bent in an upwardly convex shape and protruding into the insertion space for the memory card, is formed in close proximity to a tip of first switch member 852. Contact part 852c, extending sideways and reaching a point above contact part 853c of second switch member 853, is connected to a tip of first switch member 852. Further, contact part 852c is positioned above and apart from contact part 853c of second switch member 853 in a state where the memory card is not inserted into the housing.

When the memory card is inserted into the insertion space of the card connector, a tip of the memory card abuts against pressing part 852f of first switch member 852 and moves in a direction indicated by Arrow P along the slope thereof, thus pressing first switch member 852 downward. This causes contact part 852c of first switch member 852 to abut against the upper surface of contact part 853c of second switch member 853. The card detection switch is then brought into an electrical conduction state and detects insertion of the memory card.

As illustrated in FIG. 17, in the conventional card connector, first switch member 852 and second switch member 853 of the card detection switch are arranged side-by-side, together with terminals to be connected to the contact pads of the memory card. It is thus difficult to narrow the pitch of the terminals, making it equally as difficult to adapt to a memory card of small size having contact pads with a narrow pitch.

It is further difficult to use the card detection switch as an identification switch configured to discriminate between a memory card intended for a card connector and an adapter in which a memory card different from the memory card is fitted. Assume that an adapter is used including a projection formed in the central part of the front end thereof for identifying a memory card intended for a card connector. When first switch member 852 and second switch member 853 of the card detection switch are arranged in a central part of the memory card in a width direction, it is difficult to fit terminals to be connected to the contact pads positioned in the central part of the memory card in a width direction.

Moreover, contact parts 852c and 853c of the card detection switch are positioned inward from pressing part 852f with respect to the insertion direction of the memory card. To enable detection of a projection formed at the front end of an adapter, first switch member 852 and second switch member 853 extend further inward from pressing part 852f against which the projection abuts. This results in a larger dimension of the card connector with respect to the insertion direction of a memory card and a larger-size card connector.

It would be thus advantageous to develop a card connector that overcomes the above-referenced disadvantages.

SUMMARY OF THE INVENTION

Therefore, an object of the Present Invention is to alleviate and overcome the disadvantages encountered by conventional card connectors through the provision of a reliable card connector of a simple structure and a compact overall size. The card connector of the Present Invention comprises an identification switch configured to identify a card and a card adapter, placed in the innermost part of a housing in a card insertion direction. The identification switch is designed to detect a projection formed at a front end of the card adapter, ensuring the identification switch will operate reliably to identify a card and a card adapter without the identification switch influencing the arrangement of any terminals.

Accordingly, the Present Invention provides a card connector comprising: A housing configured to accommodate a card adapter in which a first card is fitted or a second card; terminals attached to the housing and configured to come into contact with the contact pads of the card adapter or the second card; a card guiding mechanism having an urging member configured to urge the card adapter or the second card in a direction opposite to an insertion direction, the card guiding mechanism configured to hold in a lock position the card adapter or the second card pushed in the insertion direction by way of push operation and, once the card adapter or the second card has reached an endpoint by way of the push operation for pushing in the insertion direction from the lock position, the card adapter or the second card is moved from the endpoint in a direction opposite to the insertion direction by way of an urging force by the urging member; and an identification switch formed by a first contact member and the second contact member arranged further inward in the insertion direction from the insertion direction front end of the second card held in the lock position, the identification switch configured to identify the card adapter and the second card; wherein the card adapter has a front projection extending forward from an insertion direction front end and wherein the first contact member is displaced in the thickness direction of the card adapter and comes into contact with the second contact member when abutting against the front projection of the card adapter.

The Present Invention further provides another card connector wherein the first contact member and the second contact member are formed by a plate material made of a conductive material having a spring property and include arm parts extending in a direction crossing the insertion direction and abutting parts connected to the free ends of the arm parts respectively, and wherein the abutting part of the first contact member comes into contact with the abutting part of the second contact member when abutting against the front projection of the card adapter.

The Present Invention further provides another card connector wherein the housing includes a front projection accommodating part in the innermost part of the insertion direction in which the front projection of the card adapter enters, and wherein the abutting parts of the first contact member and the second contact member are arranged in the front projection accommodating part.

The Present Invention further provides another card connector wherein the front projection of the card adapter abuts against the abutting part of the first contact member when the card adapter is positioned in the lock position or further inward in the insertion direction from the lock position.

The Present Invention further provides another card connector wherein the arm part of the first contact member and the arm part of the second contact member extend in the same direction.

The Present Invention further provides another card connector wherein the arm part of the first contact member and the arm part of the second contact member extend in opposite directions to each other.

In accordance with the Present Invention, the card connector includes an identification switch configured to identify a card and a card adapter arranged in the innermost part of a housing in the card insertion direction and detects a front projection formed at the front end of the card adapter by way of the identification switch. This assures that the identification switch operates correctly to identify a card and a card adapter. The existence of the identification switch does not influence the arrangement of the terminals. The resulting card connector has a simple structure and a reduced overall size, thereby enhancing reliability.

BRIEF DESCRIPTION OF THE FIGURES

The organization and manner of the structure and operation of the Present Invention, together with further objects and advantages thereof, may best be understood by reference to the following Detailed Description, taken in connection with the accompanying Figures, wherein like reference numerals identify like elements, in which:

FIG. 10A illustrates an operation of fitting and taking out the card adapter of FIG. 1, in a state where a slide member is in an initial position thereof;

FIG. 10B illustrates the same operation of fitting and taking out the card adapter of FIG. 10A, in a state where the slide member is at a predetermined distance from a lock position thereof;

FIG. 10C illustrates the same operation of fitting and taking out the card adapter of FIG. 10A, in a state where the slide member is in a lock position thereof;

FIG. 10D illustrates the same operation of fitting and taking out a card adapter of FIG. 10A, in a state where the slide member is in a deepest position thereof;

FIG. 12A illustrates the operation of an identification switch according to one embodiment of the Present Invention, and is a cross sectional view of FIG. 10, illustrating a state where a slide member is in the initial position thereof;

FIG. 12B illustrates the same operation of the identification switch of FIG. 12A, and is a cross-sectional view of FIG. 10, illustrating a state where the slide member is at a predetermined distance from a lock position thereof;

FIG. 12C illustrates the same operation of the identification switch of FIG. 12A, and is a cross sectional view of FIG. 10, illustrating a state where the slide member is in a lock position;

FIG. 12D illustrates the same operation of the identification switch of FIG. 12A, and is a cross-sectional view of FIG. 10, illustrating a state where the slide member is in the deepest position thereof;

FIG. 13A illustrates an operation of fitting and taking out a second card according to one embodiment of the Present Invention, in a state where the slide member is at a predetermined distance from the lock position thereof;

FIG. 13B illustrates the same operation of fitting and taking out the second card of FIG. 13A, in a state where the slide member is in the lock position thereof;

DETAILED DESCRIPTION OF THE PRESENTLY-PREFERRED EMBODIMENTS

Figure 1:
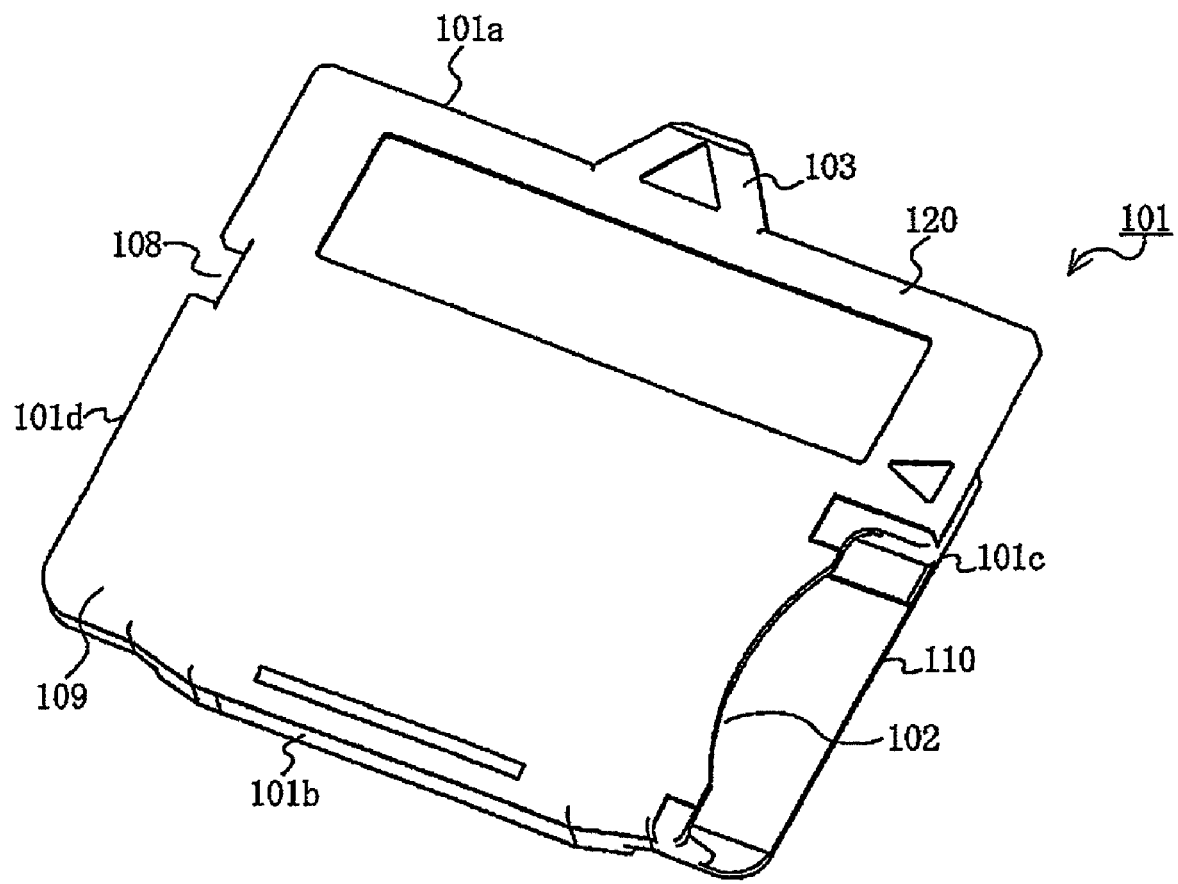
FIG. 1 is a perspective view of a card adapter according to one embodiment of the Present Invention, viewed from above.
Figure 2:
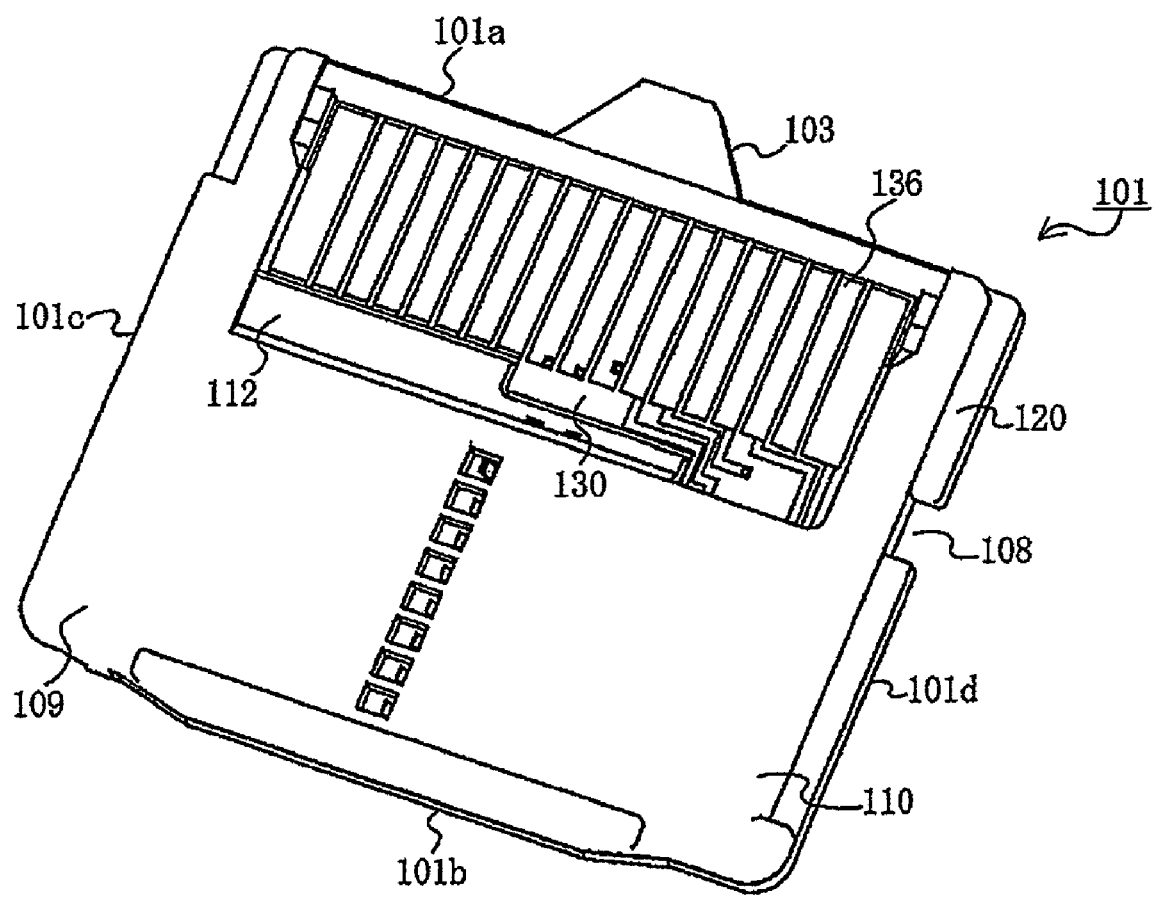
FIG. 2 is a perspective view of the card adapter of FIG. 1, viewed from below.

While the Present Invention may be susceptible to multiple embodiments in varying forms, there is shown in the Figures, and will be described herein in detail, specific embodiments, with the understanding that the Detailed Description is to be considered merely an exemplification of the principles of the Present Invention, and is not intended to limit the Present Invention exclusively to that as illustrated.

Referring to the Figures, with particular reference to FIGS. 1-5, card adapter 101 is developed in accordance with the tenets and teachings of the Present Invention. When in a state in which first card 201 is fitted thereto, card adapter 101 may itself be fitted to card connector 1. Preferably, second card 301 is fitted to card connector 1 and inserted into an electronic appliance or device (not shown) via card connector 1. When card adapter 101, to which first card 201 is fitted, is itself fitted to card connector 1, first card 201 is inserted into the electronic device via both card connector 1 and card adapter 101.

Preferably, the electronic appliance or device may be any currently-known portable device, such as a personal computer, cell phone, personal digital assistant, digital camera, video camera, music player, game machine or vehicle navigation system. Further, first card 201 and second card 301 are, preferably, any currently-known electronic card having the ability to store information thereon, such as integrated circuit cards. It is preferable that first card 201 be smaller than second card 301.

For purposes of the Present Invention, representations of directions such as up, down, left, right, front, rear and the like, used for explaining the structure and movement of various aspects of card adapter 101 and card connector 1, are not absolute, but relative. These representations are appropriate when card adapter 101, card connector 1 or their parts are in the position shown in the Figures. If the position of card adapter 101, card connector 1 or their parts changes, however, it is assumed that these representations are to be changed according to the change of card adapter 101, card connector 1 or their parts.

Referring again to FIGS. 1-5, card adapter 101 includes upper plate 120 and lower plate 110. Both upper plate 120 and lower plate 110 are plate-shaped members integrally formed of an insulating material. Housing 109 of card adapter 101 is preferably formed by laminating and binding upper plate 120 and lower plate 110. Further, card adapter 101 may be preferably fitted to card connector 1, to which second card 301 may also be fitted. Thus, card adapter 101 will have a similar external shape and dimension to that of second card 301.

Card adapter 101 further includes front projection 103, protruding forward from the center of front end 101a. Front projection 103 is preferably a feature in the configuration of card adapter 101, substantially different from that of second card 301. In the example illustrated by FIG. 1, front projection 103 has a trapezoidal shape, where its width becomes smaller in a forward direction. However, it is not required that front projection 103 be of a trapezoidal shape.

Card connector 1 further includes an identification switch to enable it to recognize or identify whether card adapter 101 or second card 301 is fitted. Front projection 103 is arranged to come into contact with the identification switch to operate the same while card adapter 101 is fitted to card connector 1. Thus, front projection 103 may have any shape and dimension as long as it is capable of coming into contact with the identification switch while card adapter 101 is fitted to card connector 1.

Card adapter 101 further includes concave part 108, formed at left end 101d. Concave part 108 is engaged with engaging convex part 21c of slide member 21 of card connector 1. Additionally, card accommodating space 102 opens at right end 101c so that first card 201 may be inserted from right end 101c into card accommodating space 102.

Figure 5:
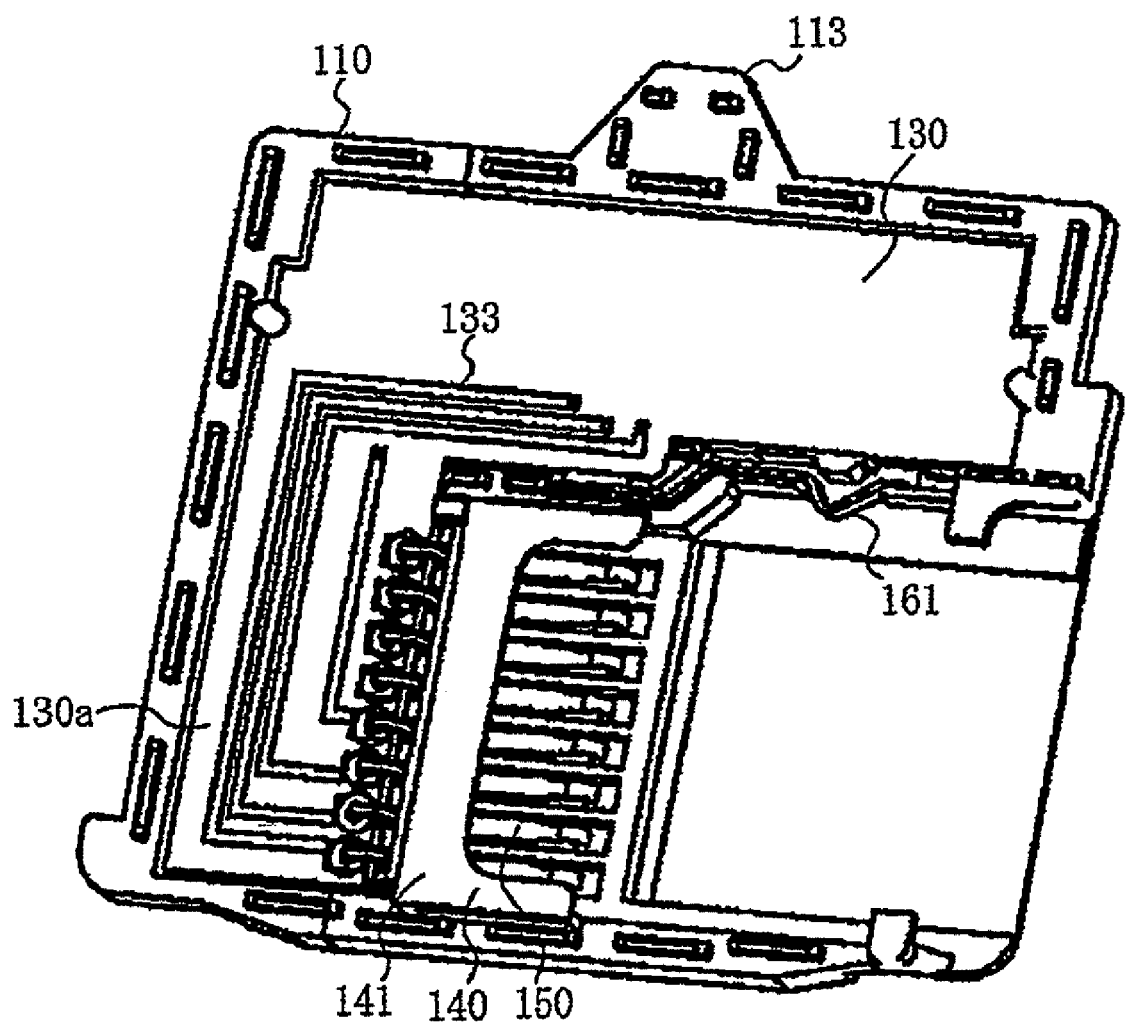
FIG. 5 is a perspective view of the card adapter of FIG. 1 with an upper plate being removed.

As illustrated in FIG. 5, inner board 130—as a wiring board, inner terminal unit 140 and card locking bracket 161 are arranged between upper plate 120 and lower plate 110. First card 201 is inserted and accommodated inside card accommodating space 102 defined between upper plate 120 and lower plate 110.

Figure 3C:
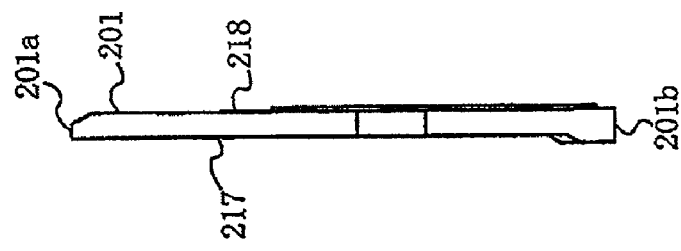
FIG. 3C is a side view of the card attached to the card adapter of FIG. 1.
Figure 3B:
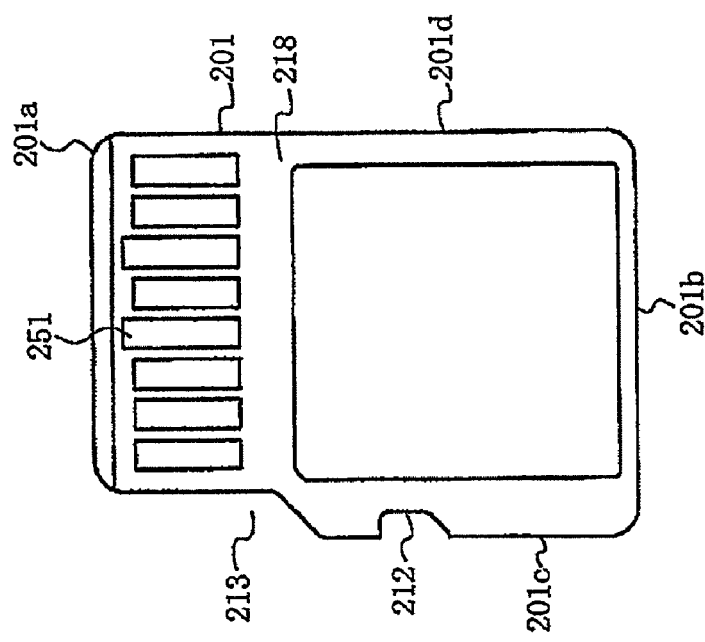
FIG. 3B is a bottom plan view of the card attached to the card adapter of FIG. 1.
Figure 3A:
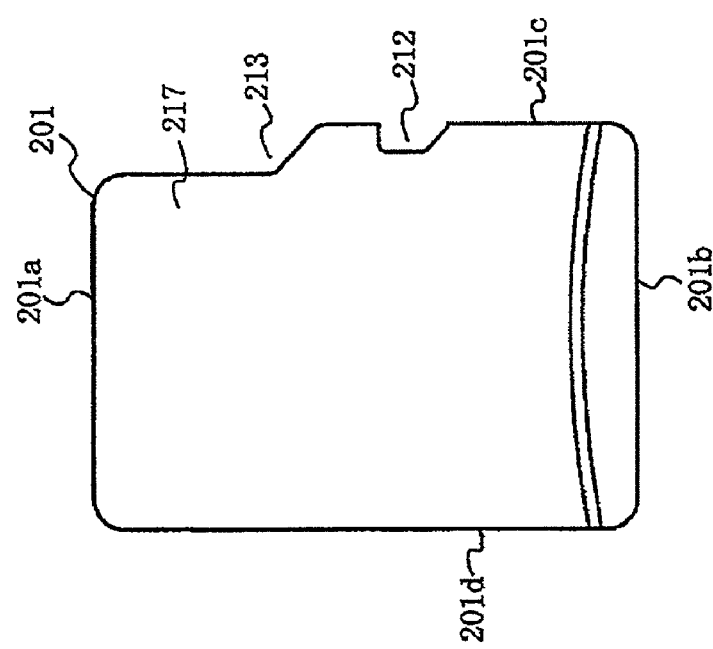
FIG. 3A is a top plan view of a card attached to the card adapter of FIG. 1.

As described above, first card 201 has the shape of a substantially rectangular plane shown in FIG. 3. In a position near front end 201a of the lower surface; that is, second surface 218, plurality of card side contact pads 251 are arranged side by side.

Concave part 212 is formed at right end 201c of first card 201, and front notch 213 is formed near front end 201a. Concave part 212 is preferably engaged with engaging convex part 161a of card locking bracket 161. Front notch 213 is provided by cutting into the corner formed by front end 201a and right end 201c over a predetermined range, and has a substantially trapezoidal shape. This forms a narrow part near front end 201a, having a smaller width than the part near the rear end.

Inner board 130 has a structure similar to that of a printed circuit board. Plurality of wires 133, as a conductive trace, and a plurality of contact pads, as adapter side connection terminals; that is, adapter side contact pads 136, are formed on the upper surface and the lower surface, i.e., on first surface 130a and a second surface of inner board 130.

When inner board 130 is mounted inside card adapter 101, adapter side contact pad 136 is exposed to outside card adapter 101 from pad corresponding opening 112 of lower plate 110. When card adapter 101 is fitted to card connector 1, terminal 51 is arranged to come into electrical contact with adapter side contact pad 136. Inner terminal unit 140 includes adapter inside card connection terminal 150, and terminal holding member 141 is configured to hold adapter inside card connection terminal 150. Adapter inside card connection terminal 150 is formed by a conductive plate material having a spring property such as a metallic plate and has one end thereof electrically connected via soldering, or the like, to a connection pad and/or a through hole to be formed on inner board 130, and has the other end thereof configured to come into electrical contact with card side contact pad 251 of first card 201 to be accommodated in card adapter 101. This brings adapter side contact pad 136 of inner board 130 into electrical conduction to card side contact pad 251 via adapter inside card connection terminal 150.

Figure 6:
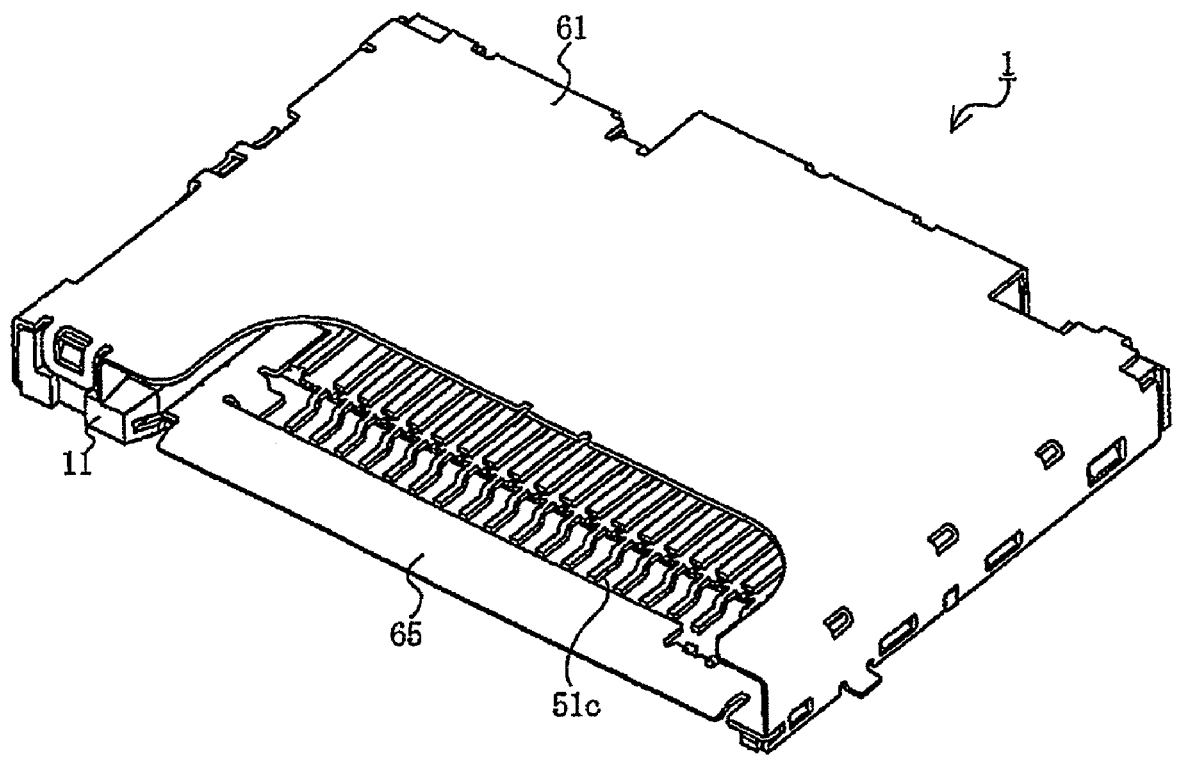
FIG. 6 is a perspective view of a card connector according to one embodiment of the Present Invention, viewed from above.
Figure 7:
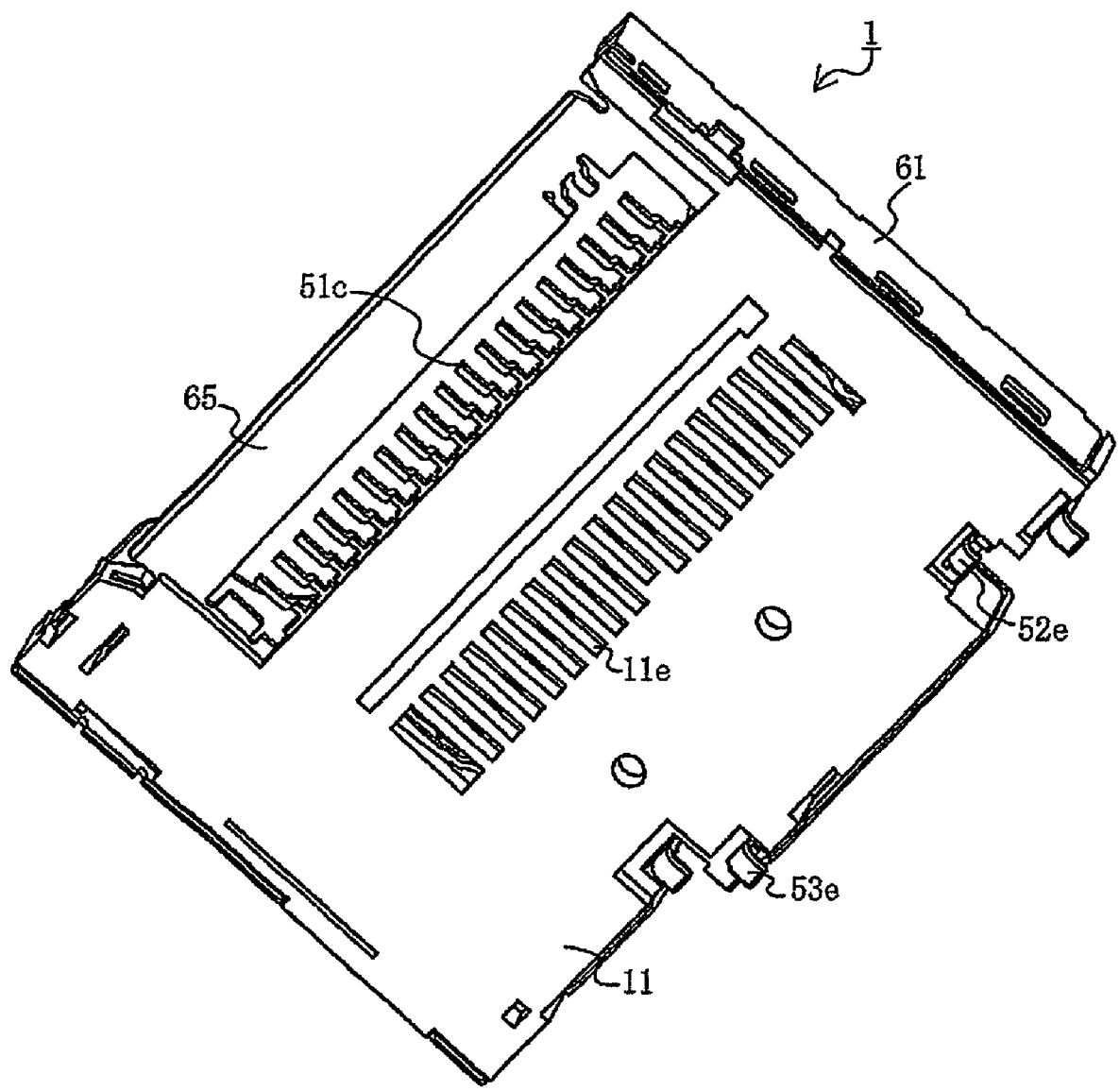
FIG. 7 is a perspective view of the card connector of FIG. 6, viewed from below.
Figure 8:
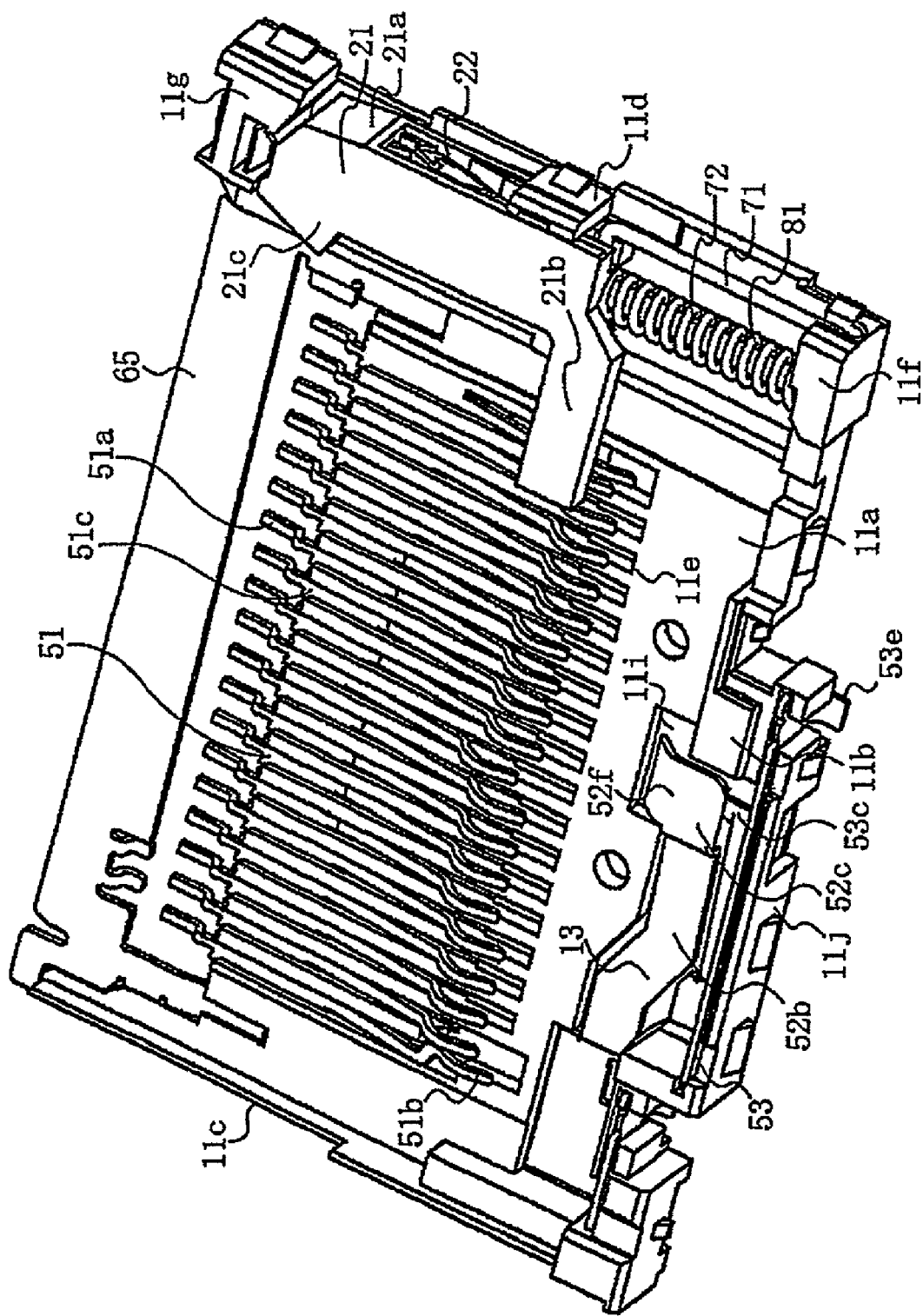
FIG. 8 is a perspective view of the card connector of FIG. 6 in a state where a shell is removed.
Figure 9:
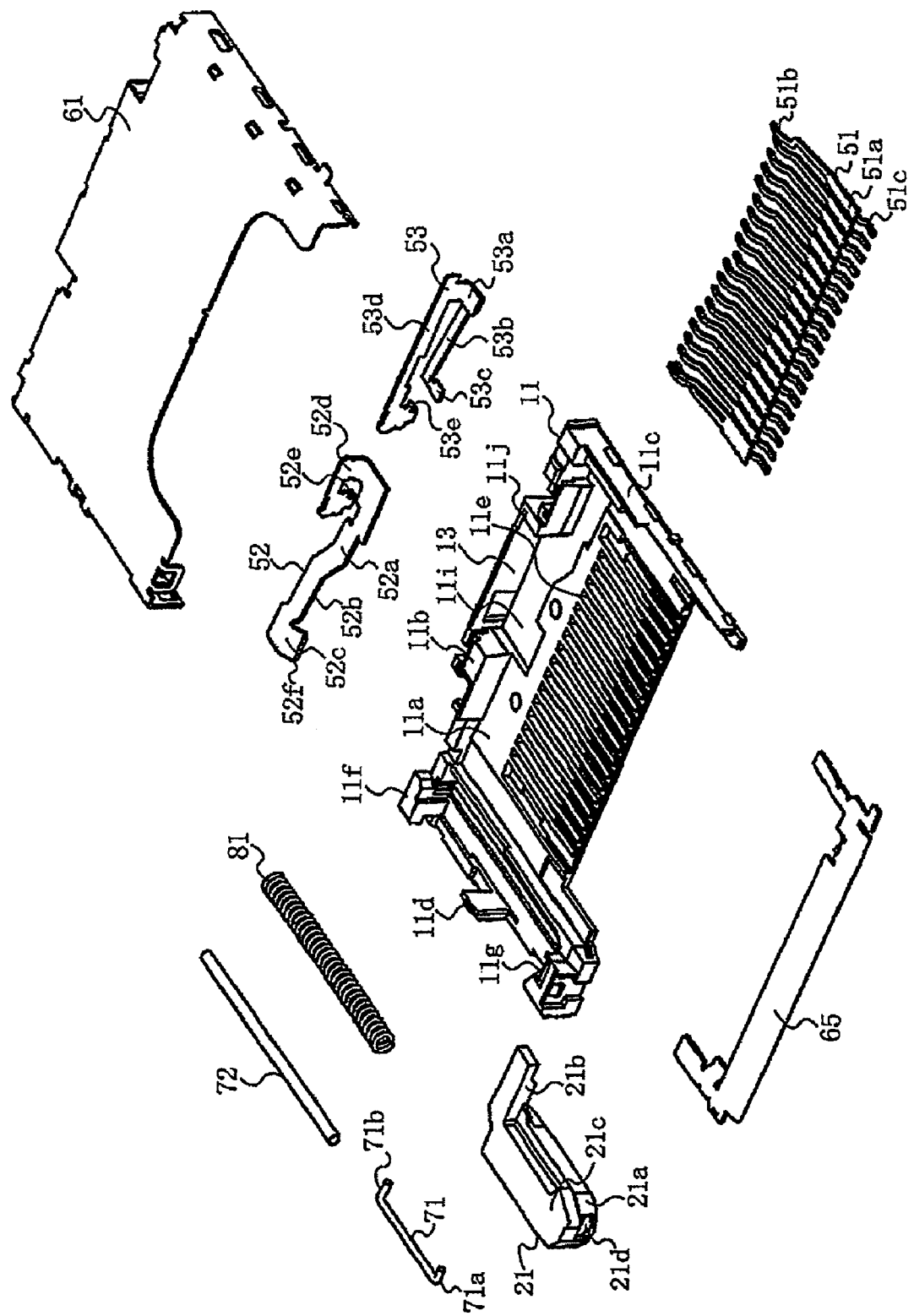
FIG. 9 is an exploded view of the card connector of FIG. 6.

Next, a description of the configuration of card connector 1 to which card adapter 101 is fitted will be provided. Reference is made particularly to FIGS. 6-9. Card connector 1 includes housing 11, integrally formed by an insulating material such as a synthetic resin and capable of accommodating card adapter 101 or second card 301, and shell 61, formed by punching and bending a plate material made of a conductive material and mounted on the upper side of housing 11. As shown in FIGS. 6-7, card connector 1 has the shape of a generally flat rectangular solid. Card connector 1 is mounted on the electronic device or appliance, and receives card adapter 101 or second card 301 inserted from the front (lower left in FIG. 6). In the illustrated example, card adapter 101 is inserted into card connector 1 with the surface where adapter side contact pad 136, as an adapter side connection terminal, is exposed facing down, that is, with lower plate 110 facing down and upper plate 120 facing up. Second card 301 may be inserted into card connector 1 with the surface where the card side contact pad is exposed facing down. FIG. 8 illustrates card connector 1 with shell 61 removed, and with the front facing in an upper right direction.

Housing 11 further includes bottom wall part 11a having a shape of the front end (lower left portion in FIG. 9) cut away in a U-letter shape and inner wall part 11b extending along the inner edge in the inner part of bottom wall part 11a and erected from bottom wall part 11a. Plurality of terminal fitting grooves 11e, configured to extend in the back-and-forth direction, are formed on the upper surface of bottom wall part 11a, with terminal 51 as a connector side terminal inserted into each of terminal fitting grooves 11e.

Terminal 51 has base part 51a attached to a portion near the front edge of bottom wall part 11a in terminal fitting grooves 11e. Tip portion 51b, formed at the tip of terminal 51, extends diagonally upward toward inner wall part 11b and protrudes above from the upper surface of bottom wall part 11a. Tip portion 51b of terminal 51 is configured to function as a contact portion and to come into electrical contact with adapter side contact pad 136, exposed from pad corresponding opening 112 in lower plate 110 of card adapter 101, or card side contact pad on second card 301. Solder tail part 51c, extending from base part 51a of terminal 51, protrudes forward from the front edge of bottom wall part 11a and is electrically connected to conductive wires, contact pads or terminals. At the front edge of housing 11 is arranged ground plate 65 made of a metallic plate.

Housing 11 further includes first side wall part 11c an L-letter shaped cross section extending in the back-and-forth direction along one side edge of bottom wall part 11a, and second side wall part 11d, extending in the back-and-forth direction along the other side edge of bottom wall part 11a. Inside second side wall part 11d is mounted to slide member 21 of a card guide mechanism arranged for guiding card adapter 101 or second card 301 inserted into the card connector 1 in a slidable manner in the back-and-forth direction.

Slide member 21 is provided with card holding part 21a for holding card adapter 101 or second card 301 and slide cam part 22 as a movable cam part. Card holding part 21a and slide cam part 22 are preferably integrally formed. Card holding part 21a includes engaging arm part 21b as a first engaging portion and engaging convex part 21c as a second engaging portion formed to protrude from the inner side surface. Engaging arm part 21b is engaged with front end 101a of card adapter 101 or front end 301a of second card 301. Engaging convex part 21c is engaged with concave part 108 of card adapter 101 or concave part 308 of second card 301. Slide member 21 holds card adapter 101 or second card 301 with engaging arm part 21b and engaging convex part 21c of card holding part 21a and moves in the back-and-forth direction together with card adapter 101 or second card 301.

Card holding part 21a includes guided hole 21d formed therein as a through-hole into which guide member 72 for guiding slide member 21 is inserted. Both ends of guide member 72 are attached to engaging portion 11f of inner wall part 11b of housing 11 and stopper part 11g of housing 11. This slides slide member 21 in the back-and-forth direction along guide member 72.

Urging member 81 is comprised of a coil spring and is arranged to surround the periphery of guide member 72. Urging member 81 has one end arranged to abut against engaging portion 11f and the other end arranged to abut against slide member 21. This urges slide member 21 in a direction opposite to the insertion direction of card adapter 101 or second card 301; that is, in the ejecting direction of card adapter 101 or second card 301 by way of urging member 81 which is capable of functioning as a compression spring.

Card connector 1 is preferably a so-called "push-in/push-out type" or a "push/push type" connector that requires the operation of pushing card adapter 101, or second card 301—when card adapter 101 or second card 301 is inserted into card connector 1 or when card adapter 101 or second card 301 is taken out of card connector 1. This operation is similar to the alternating operation (position holding type or push-on/push-off type) in the field of conventional pushbutton switches. Slide cam part 22 functions as a slide cam in a cam mechanism to perform the operation of the push/push type.

To this end, slide cam part 22 includes cam groove 23 (described in greater detail herein) formed thereon. Free end 71a of elongated pin member 71 as a fixed cam member is engaged with cam groove 23. Fixed end 71b as the other end of pin member 71 is engaged with the side surface of engaging portion 11f in inner wall part 11b of housing 11 and is pivot-coupled thereto. Pin member 71 and cam groove 23 work together to cause slide member 21, moving with card adapter 101 or second card 301, to perform the push operation. When card adapter 101 or second card 301 moves in the inserting direction and reaches an end point by the push operation to push card adapter 101 or second card 301 in the inserting direction, the card guide mechanism successfully moves card adapter 101 or second card 301, using the biasing force of urging member 81, in a direction opposite to the inserting direction from the endpoint, and ejects card adapter 101 or second card 301.

Front projection accommodating part 13, capable of accommodating front projection 103 of card adapter 101, is formed in the inner part of housing 11. More specifically, by recessing a portion of inner wall part 11b inward to form innermost wall part 11j, front projection accommodating part 13, a space protruding further inward from the inner part of housing 11, is formed. As a portion of inner wall part 11b is further recessed inward, an inner portion of bottom wall part 11a extends inward.

First contact member 52 and second contact member 53, forming an identification switch to identify which of second card 301 or card adapter 101 is fitted to card connector 1, are formed inside front projection accommodating part 13. The identification switch detects front projection 103 of card adapter 101 and operates when front projection 103 abuts against the identification switch to recognize that card connector 1, accommodating card adapter 101 rather than second card 301, is fitted. Contact member accommodating part 111, configured to accommodate a portion of first contact member 52 and second contact member 53, is formed on the upper surfaces of front projection accommodating part 13 and the region of bottom wall part 11a adjacent thereto.

First contact member 52 is formed by punching and bending a plate material made of a conductive material having a spring property. First contact member 52 includes base part 52a parallel to the upper surface of bottom wall part 11a, cantilever-shaped arm part 52b having one end connected and fixed to base part 52a and the other end—that is, a free end elastically displaceable in vertical direction, and abutting part 52c which is connected to the free end of arm part 52b and against which front projection 103 of card adapter 101 fitted to card connector 1 is abutted. The front end of abutting part 52c forms projection guide part 52f inclined downward.

First contact member 52 includes mounting portion 52d bent substantially at a right angle to base part 52a and parallel to inner wall part 11b, and tail part 52e bent substantially at a right angle at the lower end of mounting portion 52d and protruding inward. Tail part 52e is connected to signal wires, contact pads or terminals; that is, counterpart terminal members formed on a wiring board in the electronic device via a conductive binder or adhesive. Mounting portion 52d is mounted along inner wall part 11b. Tail part 52e protrudes outside housing 11. Base part 52a is arranged along the upper surface of contact member accommodating part 11i. Arm part 52b and abutting part 52c are positioned inside contact member accommodating part 11i.

Base part 52a is positioned at the right end in front projection accommodating part 13; that is, at the end near first side wall part 11c. Arm part 52b extends leftward from base part 52a parallel to innermost wall part 11j; that is, toward second side wall part 11d. Abutting part 52c is positioned at the left end in front projection accommodating part 13; that is, at the end near second side wall part 11d. Arm part 52b extends diagonally upward from base part 52a. In a state where card adapter 101 is not fitted, abutting part 52c is positioned above the upper surface of bottom wall part 11a.

Second contact member 53 is formed by punching and bending a plate material made of a conductive material having a spring property. Second contact member 53 includes base part 53a parallel to the upper surface of bottom wall part 11a, cantilever-shaped arm part 53b having one end connected and fixed to base part 53a and the other end—that is, a free end elastically displaceable in vertical direction, and abutting part 53c which is connected to the free end of arm part 53b and which abuts against abutting part 52c of first contact member 52.

Second contact member 53 includes mounting portion 53d bent substantially at a right angle to base part 53a and parallel to innermost wall part 11j, and tail part 53e bent substantially at a right angle at the lower end of mounting portion 53d and protruding inward. Tail part 53e is connected to signal wires, contact pads or terminals; that is, counterpart terminal members formed on a wiring board in the electronic device via a conductive binder or adhesive. Mounting portion 53d is mounted along innermost wall part 11j. Tail part 53e protrudes outside housing 11. Base part 53a is arranged along the upper surface of contact member accommodating part 11i. Arm part 53b and abutting part 53c are positioned inside contact member accommodating part 11i.

Base part 53a is positioned at the right end in front projection accommodating part 13; that is, at the end near first side wall part 11c. Arm part 53b extends leftward from base part 53a along innermost wall part 11j; that is, toward second side wall part 11d. Abutting part 53c is positioned at the left end in front projection accommodating part 13; that is, at the end near second side wall part 11d. Arm part 53b extends diagonally upward from base part 53a. In a state where card adapter 101 is not fitted, abutting part 53c is positioned above the upper surface of contact member accommodating part 111.

In this way, arm part 52b of first contact member 52 and arm part 53b of second contact member 53 extend from right to left in front projection accommodating part 13; that is, in the same direction. Arm part 52b of first contact member 52 is positioned above and in a more frontward position than arm part 53b of second contact member 53, so that arm part 52b and arm part 53b do not come into contact with each other in a state where card adapter 101 is not fitted.

Abutting part 52c of first contact member 52 is positioned above and apart from abutting part 53c of second contact member 53 and does not abut against abutting part 53c of second contact member 53 in a state where card adapter 101 is not fitted. When card adapter 101 is fitted, abutting part 52c of first contact member 52 is displaced downward by front projection 103 of card adapter 101 and abuts against abutting part 53c of second contact member 53.

The identification switch provided with first contact member 52 and second contact member 53 is operated by the movement of front projection 103 of card adapter 101. When front projection 103 advances into front projection accommodating part 13 and the lower surface of front projection 103 abuts against abutting part 52c of first contact member 52, abutting part 52c is displaced downward to abut against abutting part 53c of second contact member 53. In other words, the identification switch, which is initially turned "off," is turned "on." Thus, the identification switch is assumed as an initial "off" type that is turned "off" in a state where front projection 103 of card adapter 101 has not advanced into front projection accommodating part 13, and turned "on" when front projection 103 advances into front projection accommodating part 13.

Card connector 1 is preferably a connector capable of exclusively loading card adapter 101, to which first card 201 is fitted, or second card 301. When second card 301, as well as card adapter 101, is used with an electronic device or appliance that mounts card connector 1, first card 201 can also be fitted. Different types of cards often result in different number and pitch of card side contact pads as their connection terminals and different functions of conductive lines connected to respective card side contact pads. The functions are related to whether the conductive line is a power line or a signal line and what type of signals are transmitted in the case of a signal line.

Preferably, the number and pitch of adapter side contact pads 136 of card adapter 101 is equal to the number and pitch of card side contact pads of second card 301. In such an example, adapter side contact pads 136 are connected to card side contact pads 251 of first card 201, not second card 301. Thus, the function of each adapter side contact pad 136 may differ from the function of the corresponding card side contact pad of second card 301. In case the function of adapter side contact pad 136 differs from the function of the corresponding card side contact pad of second card 301, the function of a conductive line in an electronic device connected to each terminal 51 of card connector 1 must be switched between a state where card adapter 101 is fitted to card connector 1 and a state where second card 301 is fitted to card connector 1.

As described above, card connector 1 includes an identification switch to discriminate second card 301 from card adapter 101. Thus, an electronic device that mounts card connector 1 therein can detect whether card adapter 101 or second card 301 is fitted thereto based on whether the identification switch is "on" or "off," thus selecting, as required, the function of a conductive line in an electronic device connected to each terminal 51 of card connector 1. The function of a conductive line in an electronic device connected to terminal 51 is determined by the actual type of each of second card 301 and first card 201 fitted to card adapter 101.

Next, a description of the operation of card connector 1 will be provided, in which particular reference is made to FIGS. 10-12. The cam mechanism is preferably designed to perform a push operation, similar to that of an ordinary heart cam mechanism. The shape of cam groove 23 of slide cam part 22 surrounds the periphery of a heart, as illustrated in FIG. 11. A lock position, where the slide member is pushed and locked, and the corresponding peripheral part have a substantially "V" shape. In FIG. 11, initial concave part 23a corresponding to an initial position, first end concave part 23b corresponding to a first endpoint as the deepest position, lock concave part 23c corresponding to a lock position, and second end concave part 23d corresponding to a second endpoint as the deepest position, are each formed in cam groove 23. The bottom surface of cam groove 23 preferably has a stepped part to allow free end 71a of pin member 71 to move only in one direction in cam groove 23.

As illustrated in the Figures, card adapter 101 is fitted to card connector 1 and the push operation is made to remove card adapter 101 (having first card 201 fitted thereto) from card connector 1. A user inserts card adapter 101 into card connector 1 from the front. As shown in FIGS. 10A and 12A, in the initial position, front projection 103 of card adapter 101 has not reached the position of an identification switch formed by first contact member 52 and second contact member 53; thus, the identification switch is turned "off." Adapter side contact pads 136, exposed from the lower surface of card adapter 101, have not reached the position of terminals 51. For simplicity and clarity, FIGS. 8, 10 and 12 illustrate a state where shell 61 is removed.

Figure 11B:
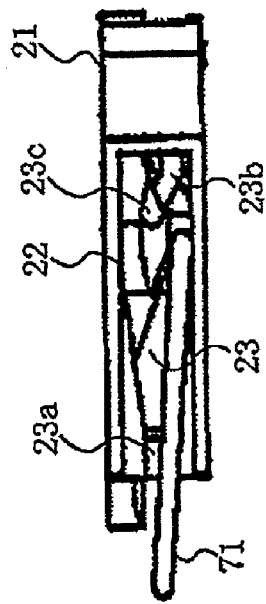
FIG. 11B illustrates the same operation of the cam mechanism of FIG. 11A, in a state where the slide member is at a predetermined distance from the lock position.
Figure 11D:
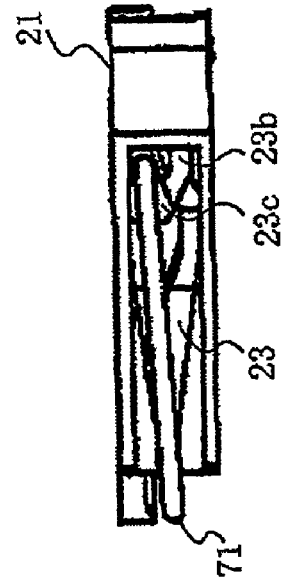
FIG. 11D illustrates the same operation of the cam mechanism of FIG. 11A, in a state where the slide member is in the deepest position thereof.
Figure 11A:
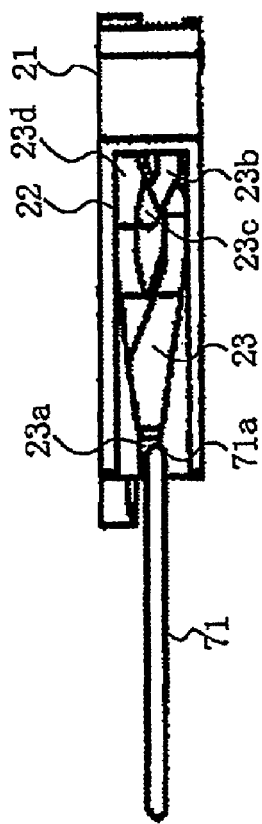
FIG. 11A illustrates an operation of a cam mechanism according to one embodiment of the Present Invention, in a state where the slide member is in the initial position thereof.

A portion of front end 101a of card adapter 101 near left end 101d is engaged with engaging arm part 21b of slide member 21. Concave part 108 formed at left end 101d of card adapter 101 is engaged with engaging convex part 21c of slide member 21. Free end 71a of pin member 71 in cam groove 23 is located in initial concave part 23a, as illustrated in FIG. 11A.

When the user pushes card adapter 101 further inside, card adapter 101 moves, together with slide member 21, toward inner wall part 11b. This is because front end 101a and concave part 108 of card adapter 101 are engaged with engaging arm part 21b and engaging convex part 21c of slide member 21. In the meantime, slide member 21 presses urging member 81, made of a coil spring, so that slide member 21 and card adapter 101 receive repulsion from urging member 81. The repulsion is smaller than the pushing force exerted by the user and slide member 21 and card adapter 101 move against the repulsion.

As illustrated in FIGS. 10B and 12B, slide member 21 and card adapter 101 reach a position at a predetermined distance from a lock position. In this position, front projection 103 of card adapter 101 abuts against abutting part 52c of first contact member 52 of the identification switch. Thus, front projection 103 has gone up over abutting part 52c so that abutting part 52c is displaced downward and abuts against abutting part 53c of second contact member 53. This brings first contact member 52 into conduction with second contact member 53, and turns "on" the identification switch. The front end of abutting part 52c forms projection guide part 52f, which is inclined downward so that front projection 103 can go up over abutting part 52c. This allows abutting part 52c to be displaced downward with front projection 103 to turn "on" the identification switch without increasing the pushing force.

Adapter side contact pad 136 of card adapter 101 is arranged to come into electrical contact with tip portion 51b of terminal 51. Free end 71a of pin member 71 in cam groove 23 is positioned before first end concave part 23b as shown in FIG. 11B.

When the user pushes card adapter 101 further inside, slide member 21 and card adapter 101 move further toward inner wall part 11b and reach a first end point. Free end 71a of pin member 71 in cam groove 23 abuts against the inner end of first end concave part 23b or slide member 21 abuts against inner wall part 11b and card adapter 101 is stopped. Side member 21 and card adapter 101 are also stopped to provide the user with the feel of a click. The user stops the push operation to release the pushing force on card adapter 101.

Figure 11C:
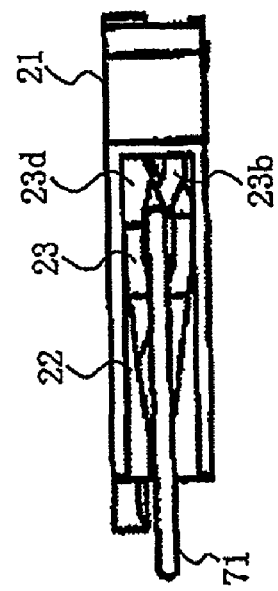
FIG. 11C illustrates the same operation of the cam mechanism of FIG. 11A, in a state where the slide member is in the lock position thereof.

With the repulsion from urging member 81, slide member 21 and card adapter 101 are moved in a direction leaving inner wall part 11b. Slide member 21 and card adapter 101 stop in a lock position where card adapter 101 is held in a lock state in card connector 1, as illustrated in FIGS. 10C and 12C. This is because free end 71a of pin member 71 is engaged inside lock concave part 23c of cam groove 23 as shown in FIG. 11C.

When card adapter 101 is held in a lock position, data communications are available between first card 201 fitted to card adapter 101 and an electronic device to which card connector 1 is attached. If card adapter 101 is held in the lock position, adapter side contact pad 136 of card adapter 101 is in contact with and conducting to tip portion 51b of terminal 51. Abutting part 52c of first contact member 52 is configured to be displaced downward by front projection 103 of card adapter 101, and keeps abutting against abutting part 53c of second contact member 53. The identification switch is kept "on."

Next, a description of the operation of ejecting card adapter 101 from card connector 1 will be provided. When the user pushes card adapter 101 further inside, slide member 21 and card adapter 101 move further from the lock position toward inner wall part 11b. As shown in FIGS. 10D and 12D, the front end of front projection 103 of card adapter 101 is configured to come into close proximity to or to abut against innermost wall part 11j. As shown in FIG. 11D, free end 71a of pin member 71 in cam groove 23 abuts against the inner end of second end concave part 23d or slide member 21 abuts against inner wall part 11b and card adapter 101 is stopped. Slide member 21 and card adapter 101 are also stopped, giving the user the feel of a click. The user stops the push operation to release the pushing force on card adapter 101.

With the repulsion from urging member 81, slide member 21 and card adapter 101 are moved in a direction leaving (or away from) inner wall part 11b. In this case, free end 71a of pin member 71 can freely move in cam groove 23, so that slide member 21 is not stopped in the lock position. Slide member 21 and card adapter 101 pass through the lock position and move further in a direction leaving inner wall part 11b. Slide member 21 and card adapter 101 return to the initial position as shown in FIGS. 10A and 12A.

Front projection 103 of card adapter 101 is disengaged from abutting part 52c of first contact member 52. Abutting part 52c is configured to be displaced upward by way of the function of arm part 52b as a spring and leaves abutting part 53c of second contact member 53. This brings first contact member 52 out of conduction from second contact member 53 and turns "off" the identification switch.

Figure 4:
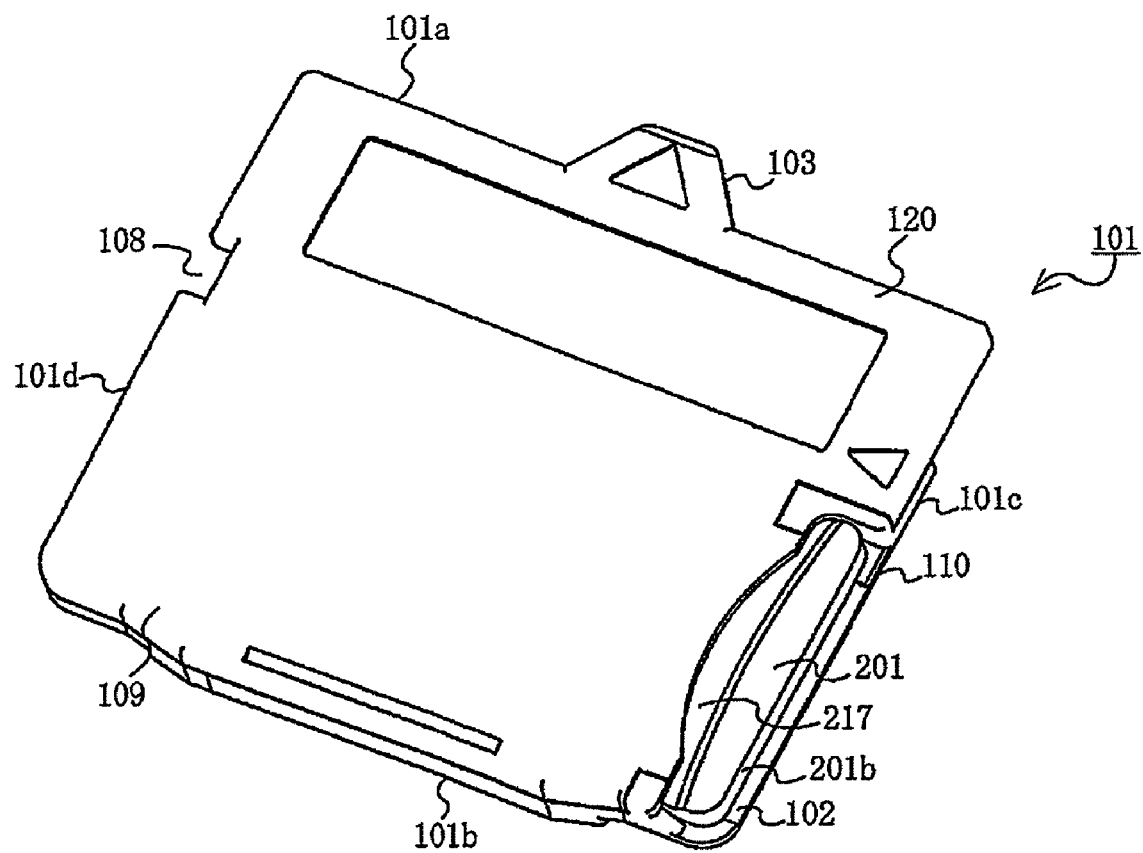
FIG. 4 is a perspective view of the card adapter of FIG. 1, with a card attached thereto, viewed from above.

Next, a description of the operation of card connector 1 in case of assumption such that second card 301 is fitted thereto will be provided. Particular reference is made to FIGS. 13-4. The operation of the portions except the identification switch formed by first contact member 52 and second contact member 53 is similar to that of fitting card adapter 101 and therefore these will not be described in more detail herein. FIGS. 13-4 illustrate a state where shell 61 is removed for simplicity, similar to FIG. 8.

The user inserts second card 301 into card connector 1 from the front of card connector 1. In the initial position, the card side contact pad on the lower surface of second card 301 has not reached the position of terminal 51. A portion of front end 301a of second card 301 near left end 301d is engaged with engaging arm part 21b of slide member 21. Concave part 308, formed at left end 301d of second card 301, is engaged with engaging convex part 21c of slide member 21.

When a user pushes second card 301 further inside, second card 301 moves, together with slide member 21, toward inner wall part 11b, as front end 301a and concave part 308 of second card 301 are engaged with engaging arm part 21b and engaging convex part 21c of slide member 21. Further, slide member 21 presses urging member 81 so that slide member 21 and second card 301 receive repulsion from urging member 81. The repulsion is smaller than the pushing force exerted by the user and slide member 21 and second card 301 move against the repulsion.

Figure 14A:
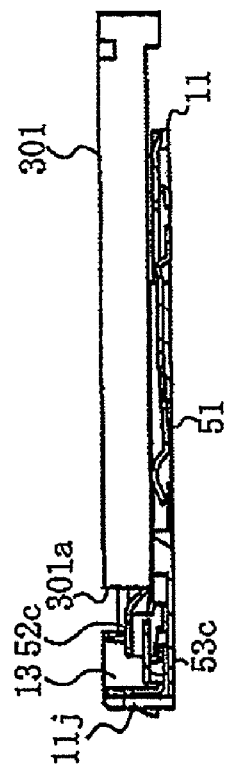
FIG. 14A is a cross-sectional view of FIG. 13, illustrating the operation of the identification switch in a state where the slide member is at a predetermined distance from the lock position thereof.

As illustrated in FIGS. 13A and 14A, slide member 21 and second card 301 reach a position at a predetermined distance from a lock position. In this position, second card 301, not including front projection 103 unlike card adapter 101, does not abut against abutting part 52c of first contact member 52. Abutting part 52c stays above and apart from abutting part 53c of second contact member 53. This does not provide electrical connection between first contact member 52 and second contact member 53. As a result, the identification switch remains "off."

The card side contact pad of second card 301 is configured to come into electrical contact with tip portion 51b of terminal 51. Free end 71a of pin member 71 in cam groove 23 is positioned before first end concave part 23b.

When the user pushes second card 301 further inside, slide member 21 and second card 301 move further toward inner wall part 11b and reach a first endpoint. Free end 71a of pin member 71 in cam groove 23 abuts against the inner end of first end concave part 23b or slide member 21 abuts against inner wall part 11b and second card 301 is stopped. Slide member 21 and second card 301 are also stopped, giving the user the feel of a click. The user stops pushing operation to release the pushing force on second card 301.

Figure 14B:
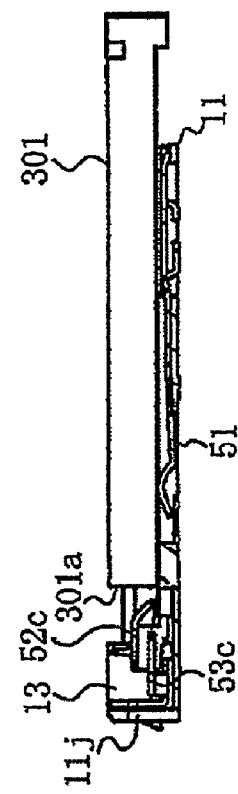
FIG. 14B is a cross sectional view of FIG. 13, illustrating the operation of the identification switch in a state where the slide member is in a lock position thereof.
Figure 15:
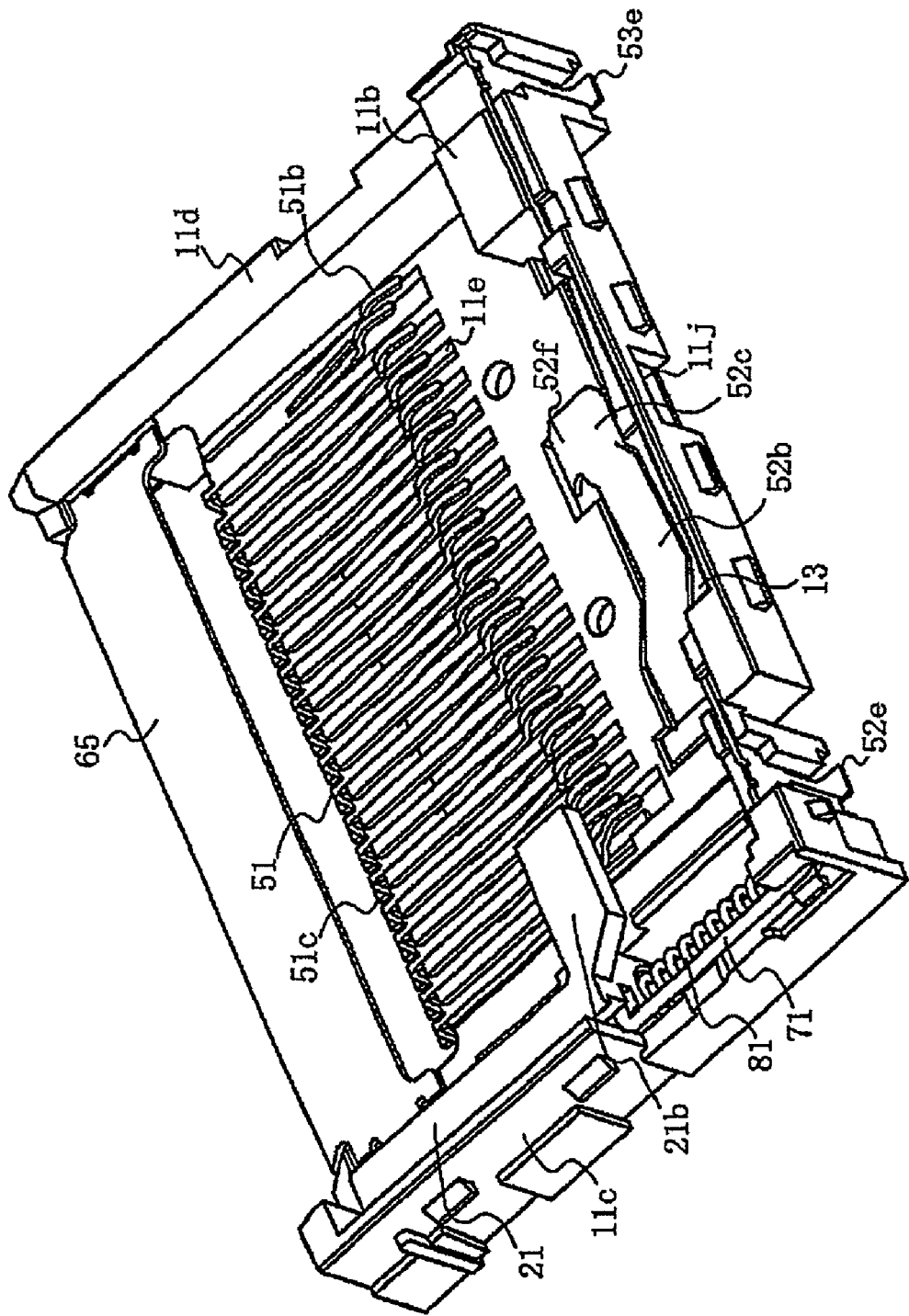
FIG. 15 is a perspective view of a card connector according to another embodiment of the Present Invention, in a state where a shell is removed.
Figure 16:
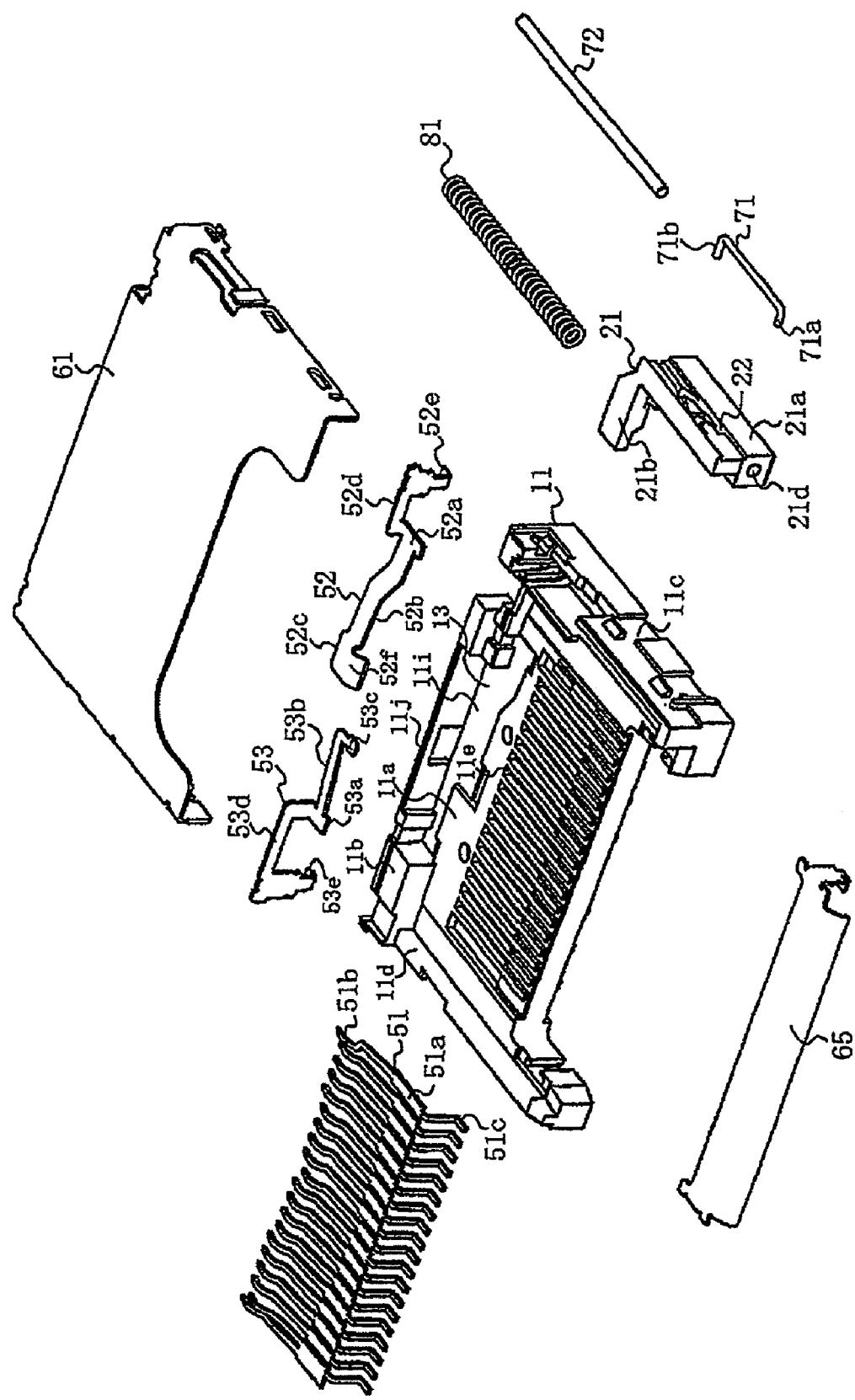
FIG. 16 is an exploded view of the card connector of FIG. 15.
Figure 17:
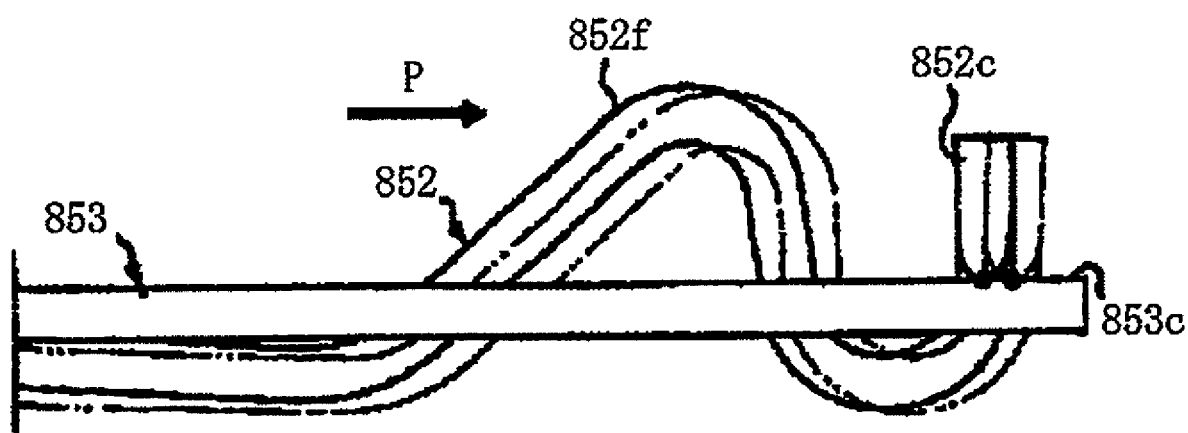
FIG. 17 shows a card detection switch of a conventional card connector.

With the repulsion from urging member 81, slide member 21 and second card 301 are moved in a direction leaving (away from) inner wall part 11b. Slide member 21 and second card 301 stop in a lock position where second card 301 is held in a lock state in card connector 1 as shown in FIGS. 13B and 14B. This is because free end 71a of pin member 71 is engaged inside lock concave part 23c of cam groove 23.

When second card 301 is held in a lock position, data communications are made available between second card 301 and an electronic device to which card connector 1 is attached. If second card 301 is held in the lock position, the card side contact pad of second card 301 is in contact with and conducting to tip portion 51b of terminal 51. Front end 301a of second card 301 does not go up on abutting part 52c of first contact member 52, so that abutting part 52c is not displaced downward by second card 301. Abutting part 52c of first contact member 52 stays above and apart from abutting part 53c of second contact member 53. As a result, the identification switch remains "off." The operation of ejecting and taking out second card 301 from card connector 1 is similar to the case of card adapter 101, except that the identification switch remains "off;" therefore, these will not be described in more detail herein.

As illustrated in the Figures, card connector 1 comprises housing 11, configured to accommodate card adapter 101 in which first card 201 is fitted or second card 301; terminals 51 attached to housing 11 and configured to come into contact with contact pads 136 of card adapter 101 or second card 301; a card guiding mechanism comprising urging member 81 arranged to urge card adapter 101 or second card 301 in a direction opposite to an insertion direction, the card guiding mechanism configured to hold in a lock position card adapter 101 or second card 301 pushed in the insertion direction by way of push operation and, once card adapter 101 or second card 301 has reached an endpoint by way of the push operation for pushing in the insertion direction from the lock position, card adapter 101 or second card 301 is moved from the endpoint in a direction opposite to the insertion direction by way of an urging force by urging member 81; and an identification switch formed by first contact member 52 and second contact member 53 arranged in an innermost part of housing 11 in an insertion direction, the identification switch configured to identify card adapter 101 and second card 301; wherein card adapter 101 comprises front projection 103 extending forward from front end 101a, and first contact member 52 is displaced in a thickness direction of card adapter 101 and comes into contact with second contact member 53 when abutting against front projection 103 of card adapter 101.

Thus, it is possible to detect front projection 103 of card adapter 101 by the identification switch, thereby correctly identifying card adapter 101 and second card 301. The existence of the identification switch does not influence the arrangement of terminals 51. The resulting card connector has a simple structure and a reduced overall size, thereby enhancing reliability.

First contact member 52 and second contact member 53 are formed by a plate material made of a conductive material, having a spring property, and include arm parts 52b and 53b, extending in a direction crossing the insertion direction, and abutting parts 52c and 53c connected to the free ends of arm parts 52b and 53b. Abutting part 52c of first contact member 52 comes into contact with abutting part 53c of second contact member 53 when abutting against front projection 103 of card adapter 101.

Thus, the amount of displacement of abutting parts 52c and 53c of first contact member 52 and second contact member 53 is not influenced by the amount of displacement of front projection 103 with respect to the insertion direction. Even in case card adapter 101 is pushed in the insertion direction by a large amount, the amount of displacement of arm parts 52b and 53b does not become excessive. This avoids plastic displacement of arm parts 52b and 53b.

Housing 11 includes front projection accommodating part 13 in the innermost part of the insertion direction in which front projection 103 of card adapter 101 enters. Abutting parts 52c and 53c of first contact member 52 and second contact member 53 are arranged in front projection accommodating part 13. If second card 301, not including front projection 103, is inserted, abutting part 52c of first contact member 52 does not abut against second card 301 and first contact member 52 and second contact member 53 do not come into contact with each other. Thus, card adapter 101 and second card 301 are correctly identified.

Front projection 103 of card adapter 101 abuts against abutting part 52c of first contact member 52 when card adapter 101 is positioned in the lock position or further inward in the insertion direction from the lock position. This causes the identification switch to operate only with front projection 103 of card adapter 101, correctly identifying card adapter 101 and second card 301.

Furthermore, arm part 52b of first contact member 52 and arm part 53b of second contact member 53 extend in the same direction. This reduces the dimensions of housing 11 with respect to the insertion direction, thus downsizing card connector 1.

A description of another embodiment of the Present Invention will be provided. Components having the same structure as that in the previously-described embodiment are given a same symbol and will not be described in detail herein. Likewise, the same operation and effects as those in the previously-described embodiment will not be described in detail herein. In this embodiment, the configurations and descriptions of card connector 1, card adapter 101, first card 201 or second card 301 are similar to that in the previously-described embodiment; therefore, these will not be described in detail herein.

In this embodiment, slide member 21 of a card guide mechanism is mounted inside first side wall part 11c. Engaging arm part 21b of slide member 21 is engaged with a portion of front end 101a of card adapter 101 near left end 101d or a portion of front end 301a of second card 301 near left end 301d. Slide member 21 does not have engaging convex part 21c for engaging with concave part 108 formed at left end 101d of card adapter 101 or concave part 308 formed at left end 301d of second card 301.

Base part 52a of first contact member 52 is positioned at the right end in front projection accommodating part 13, that is, at the end near first side wall part 11c. Arm part 52b extends leftward from base part 52a parallel to innermost wall part 11j, that is, toward second side wall part 11d. Abutting part 52c is positioned near the center in front projection accommodating part 13. Base part 53a of second contact member 53 is positioned at the left end in front projection accommodating part 13; that is, at the end near second side wall part 11d. Arm part 53b extends rightward from base part 53a along innermost wall part 11j, that is, toward first side wall part 11c. Abutting part 53c is positioned near the center in front projection accommodating part 13.

In this embodiment, arm part 52b of first contact member 52 and arm part 53b of second contact member 53 extends, in front projection accommodating part 13, from right and left toward each other; that is, in opposite directions. Similar to the previously-described embodiment, arm part 52b of first contact member 52 is positioned above and apart from abutting part 53c of second contact member 53 and does not abut against abutting part 53c of second contact member 53 in a state where card adapter 101 is not fitted. Also similar to the previously-described embodiment, when card adapter 101 is fitted, abutting part 52c of first contact member 52 is configured to be displaced downward by front projection 103 of card adapter 101 and abuts against abutting part 53c of second contact member 53.

While a preferred embodiment of the Present Invention is illustrated and described, it is envisioned that those skilled in the art may devise various modifications without departing from the spirit and scope of the foregoing Detailed Description and the appended Claims.

What is claimed is:

1. A card connector comprising:
   a housing, the housing being configured to accommodate a card adapter, in which a first card is fitted, or a second card;
   at least one terminal, each of the at least one terminals being attached to the housing;
   a card guiding mechanism having an urging member, the urging member being configured to urge the card adapter or the second card in a direction opposite to an insertion direction, the card guiding mechanism being configured to hold in a lock position the card adapter or the second card pushed in the insertion direction by way of push operation; and
   an identification switch formed by a first contact member and a second contact member, the identification switch being arranged further inward in the insertion direction from an insertion direction front end of the second card held in the lock position, the identification switch configured to identify the card adapter and the second card;
   wherein the card adapter has a front projection extending forward from an insertion direction front end; and
   wherein the first contact member is displaced in the thickness direction of the card adapter and comes into contact with the second contact member when abutting against the front projection of the card adapter.

2. The card connector of claim 1, wherein, once the card adapter or the second card has reached an endpoint by way of the push operation for pushing in the insertion direction from the lock position, the card adapter or the second card is moved from the endpoint in a direction opposite to the insertion direction by way of an urging force by the urging member.

3. The card connector of claim 2, wherein each of the at least one terminals attached to the housing is configured to come into contact with contact pads of the card adapter or the second card).

4. The card connector of claim 3, wherein:
   the first contact member and the second contact member are formed by a plate material made of a conductive material having a spring property, the first contact member and the second contact member each including arm parts extending in a direction crossing the insertion direction and abutting parts connected to the free ends of the arm parts respectively; and
   the abutting part of the first contact member comes into contact with the abutting part of the second contact member when abutting against the front projection of the card adapter.

5. The card connector of claim 4, wherein the front projection of the card adapter abuts against the abutting part of the first contact member when the card adapter is positioned in the lock position or further inward in the insertion direction from the lock position.

6. The card connector of claim 4, wherein the arm part of the first contact member and the arm part of the second contact member extend in the same direction.

7. The card connector of claim 4, wherein the arm part of the first contact member and the arm part of the second contact member extend in opposite directions to each other.

8. The card connector of claim 4, wherein:
   the housing includes a front projection accommodating part in the innermost part of the insertion direction in which the front projection of the card adapter enters; and
   the abutting parts of the first contact member and second contact member are arranged in the front projection accommodating part.

9. The card connector of claim 8, wherein the front projection of the card adapter abuts against the abutting part of the first contact member when the card adapter is positioned in the lock position or further inward in the insertion direction from the lock position.

10. The card connector of claim 8, wherein the arm part of the first contact member and the arm part of the second contact member extend in the same direction.

11. The card connector of claim 8, wherein the arm part of the first contact member and the arm part of the second contact member extend in opposite directions to each other.

12. The card connector of claim 9, wherein the arm part of the first contact member and the arm part of the second contact member extend in the same direction.

13. The card connector of claim 9, wherein the arm part of the first contact member and the arm part of the second contact member extend in opposite directions to each other.

* * * * *